US010380279B2

(12) United States Patent
Marouze et al.

(10) Patent No.: US 10,380,279 B2
(45) Date of Patent: Aug. 13, 2019

(54) METHOD AND SYSTEM FOR QUANTIFYING THE IMPACT OF FEATURES ON COMPOSITE COMPONENTS

(71) Applicant: BOMBARDIER INC., Dorval (CA)

(72) Inventors: Jean-Philippe Marouze, Montreal (CA); Vishal Kassie, Montreal (CA); Jonathan Laliberte, Ville St-Laurent (CA); Kaven Croft, Montreal (CA)

(73) Assignee: BOMBARDIER INC., Dorval (CA)

( * ) Notice: Subject to any disclaimer, the term of this patent is extended or adjusted under 35 U.S.C. 154(b) by 455 days.

(21) Appl. No.: 15/309,634

(22) PCT Filed: Apr. 30, 2015

(86) PCT No.: PCT/IB2015/053175
§ 371 (c)(1),
(2) Date: Nov. 8, 2016

(87) PCT Pub. No.: WO2015/170233
PCT Pub. Date: Nov. 12, 2015

(65) Prior Publication Data
US 2017/0242942 A1    Aug. 24, 2017

Related U.S. Application Data

(60) Provisional application No. 61/990,840, filed on May 9, 2014.

(51) Int. Cl.
*G06F 17/50* (2006.01)
*G05B 19/4097* (2006.01)

(52) U.S. Cl.
CPC ..... *G06F 17/5009* (2013.01); *G05B 19/4097* (2013.01); *G05B 2219/45238* (2013.01); *G06F 2217/12* (2013.01); *Y02P 90/265* (2015.11)

(58) Field of Classification Search
CPC ................ G06F 17/5009; G05B 19/4097
(Continued)

(56) References Cited

U.S. PATENT DOCUMENTS

| 5,562,788 A | 10/1996 | Kitson et al. |
| 6,799,081 B1 | 9/2004 | Hale et al. |

(Continued)

FOREIGN PATENT DOCUMENTS

| CN | 1375770 A | 10/2002 |
| CN | 101959671 A | 1/2011 |

(Continued)

OTHER PUBLICATIONS

S. Prabhakar, "A Methodology for Finite Element Analysis of Curvilinear Fiber Laminates with Defects, Fabricated by Automated Fiber Placement Technique", thesis submitted to McGill University in partial fulfillment of the requirements of the degree Masters in Engineering, Dec. 2011, 111 pages.

(Continued)

*Primary Examiner* — Andre Pierre Louis
(74) *Attorney, Agent, or Firm* — Norton Rose Fulbright Canada LLP

(57) ABSTRACT

There is described herein a process for assigning location-specific correction factors to composite components using data obtained from the simulation of an automated manufacturing process, and correlating the location-specific correction factors to safety margins across the surface of the composite component, in order to quantify the impact of features introduced by the manufacturing process.

21 Claims, 11 Drawing Sheets

(58) Field of Classification Search
USPC .......................................................... 703/1
See application file for complete search history.

(56) References Cited

U.S. PATENT DOCUMENTS

| | | | |
|---|---|---|---|
| 6,871,684 | B2 | 3/2005 | Engelbart et al. |
| 7,489,392 | B2 | 2/2009 | Engerlbart et al. |
| 7,555,404 | B2 | 6/2009 | Brennan et al. |
| 7,835,567 | B2 | 11/2010 | Oldani |
| 7,978,328 | B2 | 7/2011 | Engelbart et al. |
| 8,108,058 | B2 | 1/2012 | Murrish et al. |
| 8,184,281 | B2 | 5/2012 | Engelbart et al. |
| 8,377,239 | B2 | 2/2013 | Engelbart et al. |
| 8,524,021 | B2 | 9/2013 | Engelbart et al. |
| 2003/0229476 | A1 | 12/2003 | Naganarayanna et al. |
| 2009/0234616 | A1 | 9/2009 | Perkins |
| 2011/0208487 | A1 | 4/2011 | Looney et al. |
| 2013/0018499 | A1 | 1/2013 | Miller et al. |
| 2013/0050685 | A1 | 2/2013 | Hunt et al. |
| 2015/0046098 | A1* | 2/2015 | Jack ................... G06F 17/5009 702/33 |

FOREIGN PATENT DOCUMENTS

| | | |
|---|---|---|
| CN | 102264534 A | 11/2011 |
| CN | 102649210 A | 8/2012 |
| WO | 2013105995 | 7/2013 |

OTHER PUBLICATIONS

P. Feraboli, "Composite Materials Strength Determination Within the Current Certification Methodology for Aircraft Structures", Journal of Aircraft, vol. 46, No. 4, Jul.-Aug. 2009, pp. 1365-1374.

K. Fayazbakhsh et al., "Defect Layer Method to Capture Effect of Gaps and Overlaps in Variable Stiffness Laminates made by Automated Fiber Placement", Composite Structures, vol. 97, Nov. 6, 2012, pp. 245-251.

International Search Report and Written Opinion dated Aug. 3, 2015 in connection with International Patent Application PCT/IB2015/053175, 12 pages.

Cairns et al., "Response of Automated Tow Placed Laminates to Stress Concentrations", NASA. Langley Research Center, Third NASA Advanced Composites Technology Conference, vol. 1, Part 2, Accession No. 95N28833 Jan. 1993, pp. 649-663.

Boghetti et al., "Influence of Ply Waviness on Stiffness and Strength Reduction of Composite Laminates", Army Research Laboratory, Aberdeen Proving Ground MD, Accession No. ADA263224, Apr. 1993, 56 pages.

Cairns et al., "Fracture Scaling Parameters of Inhomogenious Microstructure in Composite Structures", Composites Sceince and Technology, vol. 53, No. 2, Feb. 1995, pp. 223-231.

Measom et al., "Fiber Placement Low-Cost Production for Complex Composite Structures" 52nd Annual Forum, American Helicopter Society, Washington, Jun. 1996, 13 pages.

Hsiao et al., "Effect of Fiber Waviness on Stiffness and Strength Reduction of Unidirectional Composite Under Compressive Loading", Composites Science and Technology, vol. 56, No. 5, 1996, pp. 581-593.

Sawicki et al., "The Effect of intraply overlaps and gaps upon the compression strength", American Institute of Aeronautics and Astronautics, 39th AIAA/ASME/ASCE/AHS/ASC Structures, Structural Dynamics, and Materials Conference and Exhibit, Apr. 1998, pp. 744-754.

Turoski, "Effects of Manufacturing Defects on the Strength of Toughened Carbon/Epoxy Prepreg Composites", Thesis submitted to Montana State University, Jul. 2000, 137 pages.

Iarve et al., "Strength Prediction and Measurement in model Multilayered Discontinuous Tow Reinforced Composites", Journal of Composite Materials, vol. 38, No. 1, Jan. 2004, pp. 5-18.

Blom et al., "A Theoretical Model to study the influence of Tow-rop Areas on the Stiffness and Strength of Variable-stiffness Laminates", Journal of Composite Materials OnlineFirst, Jan. 2009, pp. 1-27.

Sawicki et al., "Structural Qualification of V-22 EMD Tow-Placed Aft Fuselage", 51nd Annual Forum, American Helicopter Society, Fort Worth, Texas, May 1995, pp. 1641-1653.

Legay et al., "Impact and Compression Behaviour of AFP Manufactures Carbon-Eepoxy Composites Containing Gaps and Overlaps", American Society for Composites, 26th Annual Technical Conference, vol. 2, Montreal, Canada, Sep. 2011, pp. 1163-1179.

Kimball, "Open hole compressive behavior of laminates with converging gap defects", Thesis presented to The University of Utah, May 2011, 102 pages.

Croft et al. "Experimental study of the effect of automated fiber placement induced defects on performance of composite laminates", Composites Part A, May 2011, vol. 42, No. 5, pp. 484-491.

The State Intellectual Property Office of the People'S Republic of China, Notification of First Office Action dated Jun. 5, 2018 re: Application No. 201580024642.8.

English translation of China patent document No. CN 1375770 dated Oct. 23, 2002, https://patents.google.com/patent/CN1375770A/en?oq=CN1375770A, accessed on Jul. 23, 2018.

English translation of China patent document No. CN 101959671 dated Jan. 26, 2011, https://patents.google.com/patent/CN101959671A/en?oq=CN101959671A, accessed on Jul. 23, 2018.

English translation of China patent document No. CN 102264534 dated Nov. 30, 2011, https://patents.google.com/patent/CN102264534A/en?oq=CN102264534a, accessed on Jul. 23, 2018.

English translation of China patent document No. CN 102649210 dated Aug. 29, 2012, https://patents.google.com/patent/CN102649210A/en?oq=CN102649210A, accessed on Jul. 23, 2018.

Lyu, The Components of Mechanical and Electronic Products Security Key Degree of Quantitative Research, Feb. 27, 2014, pp. 168-169, China Academic Journal Electronic Publishing House, China.

\* cited by examiner

METHOD AND SYSTEM FOR QUANTIFYING THE IMPACT OF FEATURES ON COMPOSITE COMPONENTS

CROSS-REFERENCE TO RELATED APPLICATIONS

This application claims priority under 35 U.S.C. 119(e) to U.S. application No. 61/990,840 filed May 9, 2014, entitled "A Method and System for Quantifying the Impact of Features on Composite Components", the entire contents of which are hereby incorporated by reference.

TECHNICAL FIELD

The present invention relates to the field of designing and manufacturing composite components using automated manufacturing processes and more particularly, to addressing the presence of features that occur during the manufacturing phase, at the design phase, by quantifying the impact of the manufacturing features on the composite component.

BACKGROUND OF THE ART

Composite materials (or components) are materials made from two or more constituent materials with significantly different physical or chemical properties. when combined, they produce a material with characteristics different from the individual components, with the aim of using the benefit of both. Automated Fiber Placement (AFP) machines are used for the manufacture of such composite components, by laying fiber strips (tows) along a mold in multiple layers in order to create a composite component having the shape of the mold. The fiber strips are placed along the mold in accordance with fiber laying trajectories that are input into the AFP machine to create a given component in accordance with a set of design parameters.

One of the challenges encountered when using AFP machines is the presence of features that necessarily occur when laying fibers on the surface of complex-shaped structures. These features, such as fiber gaps, fiber overlap and angle deviations, have an impact on the structural properties of the composite material. Existing methods of compensating for these features include adding more plies of material throughout the part to ensure that the final product meets strict guidelines for safety. However, this existing solution means more material added to the component, which leads to increased costs and increased weight for the component.

SUMMARY

There is described herein a process for assigning location-specific correction factors to composite components using data obtained from the simulation of an automated manufacturing process, and correlating the location-specific correction factors to safety margins across the surface of the composite component, in order to quantify the impact of features introduced by the manufacturing process.

In accordance with a first broad aspect, there is provided a computer-implemented method for quantifying an impact of features on a composite component to be manufactured using an automated manufacturing process, the features resulting from the manufacturing process. The method comprises receiving a set of simulation data related to a virtual simulation of the manufacturing process for the composite component using a set of design parameters; extracting a location and nature of the features from the simulation data; assigning location-specific correction factors to the composite component as a function of an impact of the features at corresponding locations; and correlating the location-specific correction factors to allowable safety margins at each one of the corresponding locations.

In some embodiments, correlating the location-specific correction factors to allowable safety margins comprises partitioning a surface of the composite component into a plurality of regions; determining the allowable safety margins for the plurality of regions; applying the location-specific correction factors to the allowable safety margins for regions having features located therein; and generating updated safety margins per region.

In some embodiments, the method further comprises rejecting the design parameters when at least one of the updated safety margins falls below a predetermined threshold.

In some embodiments, the method further comprises modifying the design parameters when at least one of the updated safety margins falls below a predetermined threshold. Modifying the design parameters may comprise modifying angle tolerances. Modifying the design parameters may also comprise directing at least one feature from a region of lower safety margin to a region of higher safety margin.

In some embodiments, the method further comprises modifying the design parameters to redistribute the features throughout the composite component.

In some embodiments, the method further comprises repeating steps of receiving a set of simulation data, extracting a location and nature of the features, assigning location-specific correction factors, and correlating the location-specific correction factors, with the design parameters as modified. Repeating may comprise further modifying the design parameters and continuing the repeating until acceptable design parameters are obtained.

In some embodiments, assigning location-specific correction factors comprises retrieving the location-specific correction factors from a lookup table comprising predetermined correction factors for corresponding feature values, the predetermined correction factors having been validated or being representative of test results.

In some embodiments, the automated manufacturing process is an automated fiber placement process.

In accordance with another broad aspect, there is provided a system for quantifying an impact of features on a composite component to be manufactured using an automated manufacturing process, the features resulting from the manufacturing process. The system comprises a memory; a processor; and at least one application stored in the memory. The application is executable by the processor for receiving a set of simulation data related to a virtual simulation of the manufacturing process for the composite component using a set of design parameters; extracting a location and nature of the features from the simulation data; assigning location-specific correction factors to the composite component as a function of an impact of the features at corresponding locations; and correlating the location-specific correction factors to allowable safety margins at each one of the corresponding locations.

In some embodiment, correlating the location-specific correction factors to allowable safety margins comprises partitioning a surface of the composite component into a plurality of regions; determining the allowable safety margins for the plurality of regions; applying the location-specific correction factors to the allowable safety margins for regions having features located therein; and generating updated safety margins per region. The at least one application may further be configured for rejecting the design parameters when at least one of the updated safety margins falls below a predetermined threshold. The at least one application may also be further configured for modifying the design parameters when at least one of the updated safety margins falls below a predetermined threshold.

In some embodiments, modifying the design parameters comprises modifying angle tolerances. In some embodiments, modifying the design parameters comprises directing at least one of the features from a region of lower safety margin to a region of higher safety margin.

In some embodiments, the at least one application is further configured for modifying the design parameters to redistribute the features throughout the composite component. The at least one application may further be configured for repeating steps of receiving a set of simulation data, extracting a location and nature of features, assigning location-specific correction factors, and correlating the location-specific correction factors, with the design parameters as modified. In some embodiments, repeating comprises further modifying the design parameters and continuing the repeating until an acceptable design is obtained.

In some embodiments, assigning location-specific correction factors comprises retrieving the location-specific correction factors from a lookup table comprising predetermined correction factors for corresponding feature values, the predetermined correction factors having been validated or being representative of test results.

In some embodiments, the automated manufacturing process is an automated fiber placement process.

In accordance with yet another broad aspect, there is provided a computer readable medium having stored thereon program code executable by a processor for quantifying an impact of features on a composite component to be manufactured using an automated manufacturing process, the features resulting from the manufacturing process. The program code is executable for receiving a set of simulation data related to a virtual simulation of the manufacturing process for the composite component using a set of design parameters; extracting a location and nature of the features from the simulation data; assigning location-specific correction factors to the composite component as a function of an impact of the features at corresponding locations; and correlating the location-specific correction factors to allowable safety margins at each one of the corresponding locations.

In this specification, the term "features" is intended to mean any characteristic of the composite component that may be introduced by the manufacturing process such that the component, as manufactured, differs from the component as designed. Such features may have an influence on the quality of the component, should they find themselves in the manufactured component. The manufacturing process may be Automated Aber Placement (AFP), Automated Tape Laying (ATP), or other known manufacturing processes that generate composite components through automation by laying material in a piece-wise manner. Features introduced by the manufacturing process may comprise gaps, overlaps, steering radius, and angle deviations. Gaps refer to missing material in areas that should not have any missing material, overlaps refer to the unintentional overlapping of material, steering radius refers to the binormal radius of curvature along a fiber path, and angle deviations refer to a misalignment.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
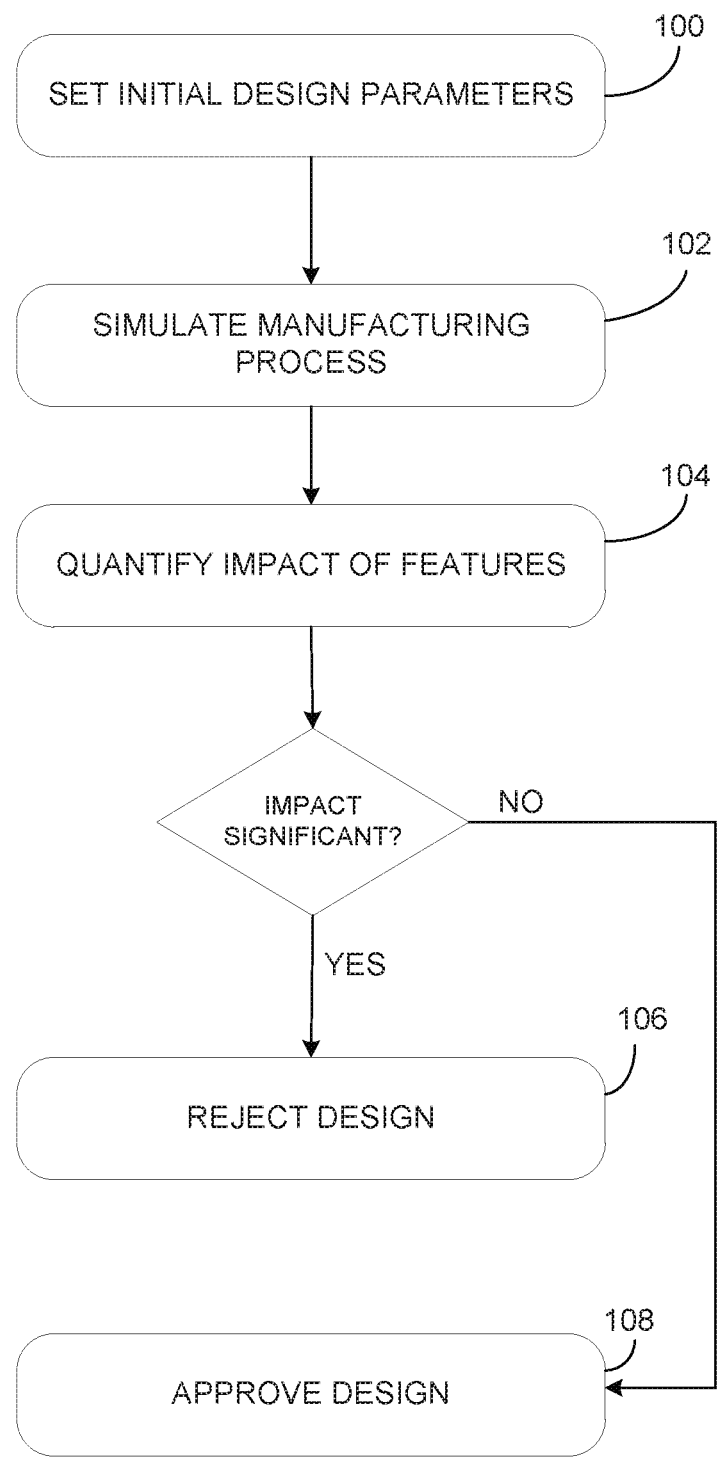
FIG. 1a is an exemplary flowchart of a method for designing a composite component and validating the design in accordance with one embodiment.
Figure 1B:
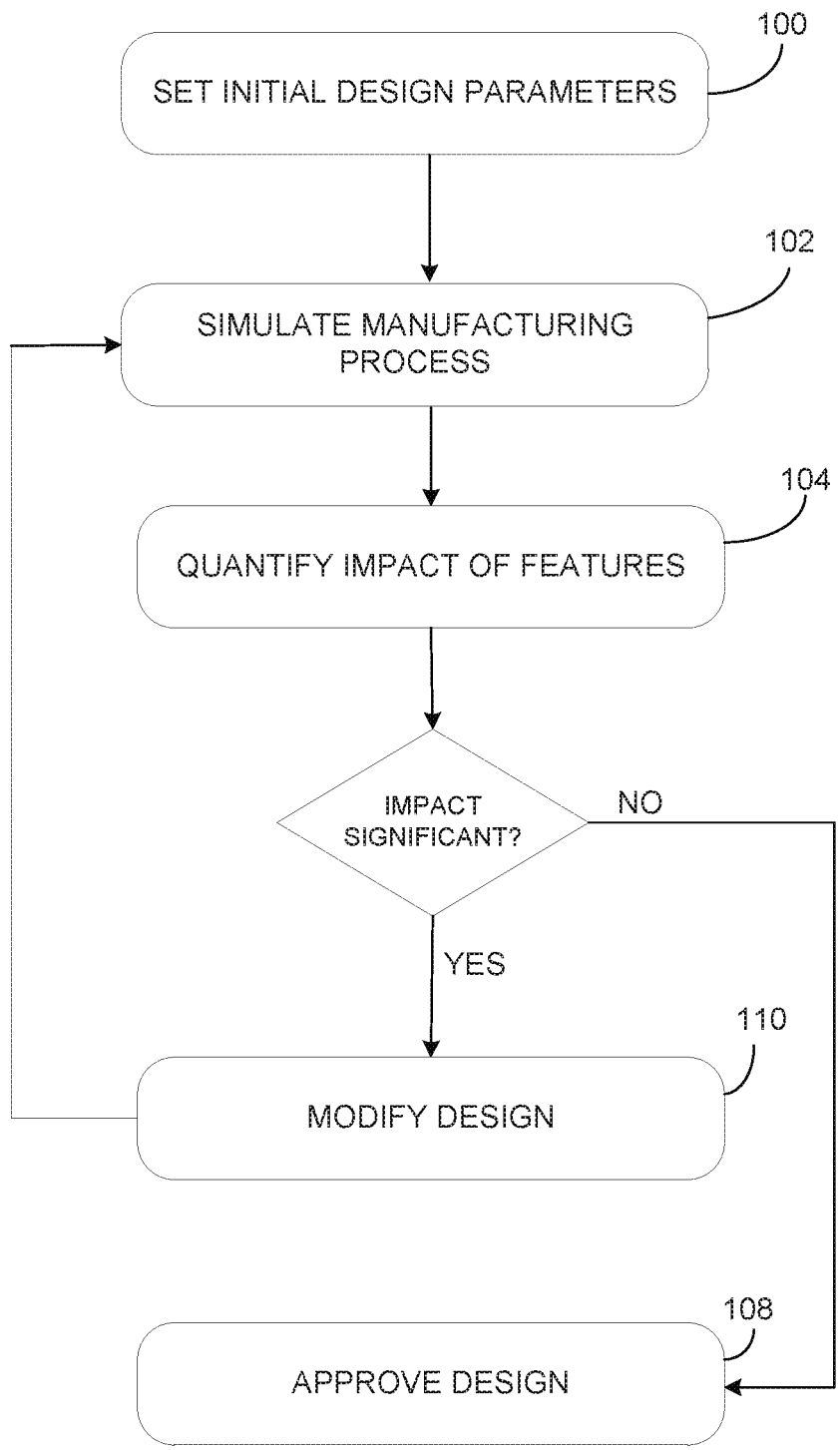
FIG. 1b is an exemplary flowchart of a method for designing a composite component using a feedback loop to optimize the design in accordance with one embodiment.

Referring to FIGS. 1a and 1b, a method for designing a composite component to be manufactured using an automated manufacturing process will now be described. For illustrative purposes, the process described is an Automated Fiber Placement (AFP) process. The composite component may comprise various materials, such as but not limited to cements, concrete, reinforced plastics, metal composites and ceramic composites. For example, the composite component may be composed of composite fiber-reinforced plastics. The composite component may be used for various applications, including but not limited to buildings, bridges, spacecrafts, aircrafts, watercrafts, land vehicles including railway vehicles, and structures such as wind turbine blades, swimming pool panels, bathtubs, storage tanks, and counter tops.

FIG. 1a is an illustrative flowchart of a method for designing a composite component, in accordance with one embodiment. Initial design parameters are set 100 as a function of a set of specifications and requirements, or constraints and objectives. Design parameters may include geometric ply definitions such as ply thickness, angle tolerances, engineering coordinate system, and ply boundaries. Design constraints may impact various mechanical properties, such as strength properties, elastic properties, stability, and physical properties, that are defined by a set of "design allowables". For example, tension, compression, and shear are given theoretical values and test validated at the time of design and these values are known as the design allowables. The design allowables are used to obtain safety margins, which correspond to the component's structural capacity beyond the expected loads or actual loads, i.e. how much stronger is the component than it needs to be for an intended load. Many components are purposefully built much stronger than needed for normal usage to allow for emergency situations, unexpected loads, misuse, and/or degradation. Safety margins for specific applications are often mandated by law, policy, or industry standards The safety margins may be determined as follows:

$$\text{safety\_margin} = \left(\frac{\text{design\_allowable}}{\text{design\_load}} - 1\right) * 100$$

The design load corresponds to the maximum expected load the component should see when in use. By this definition, a component with a design load of 40 N and a design allowable of 50 N will have a safety margin of 25%. Features introduced during the manufacturing phase may have an impact on the design allowables, and thus reduce the safety margins.

A correction factor, sometimes referred to as a knockdown, may be used to account for the feature. The correction factor is intended to represent the difference in the design allowable between a theoretical value and a true value when taking into account the features. Put otherwise, the correction factor adjusts (i.e reduces) the design allowable so as to account for the impact of the manufacturing features on the component's mechanical properties. A correction factor may be used to determine a true allowable as follows:

$$\text{true\_allowable} = \text{design\_allowable} * \left(1 - \frac{\text{correction\_factor}}{100}\right)$$

Using the example above, if a feature requires a correction factor of 10% (or 0.1), then the true allowable is 45 N. This in turn causes the safety margin to drop to 12.5%. An updated safety margin may be determined as follows:

$$\text{updated\_safety\_margin} = \left(\frac{\text{true\_allowable}}{\text{design\_load}} - 1\right) * 100$$

As the safety margins may vary over the surface of the composite component as a function of geometry and load, a given feature may have a greater or smaller impact on the margin as a function of its location. If the component is required to have a safety margin of 15% or greater, then the feature that causes the design allowable to fall by 10% is unacceptable. The present method allows this situation to be detected and remedied at the time of design.

In order to quantify the impact of features introduced by the manufacturing process, the manufacturing process is simulated 102 and simulation data is generated. The geometric ply definitions are used to determine fiber laying trajectories for manufacturing of the composite component. The manufacturing process may be simulated using one or more known simulation applications, such as CADFiber™, Fibersim™, MSC/MD Nastran™, Laminate Modeler™, MSC PATRAN™, and CATIA™. Other known software applications, such as Microsoft Excel™ and Microsoft Word™, may be used to generate files and/or to organize the results of the simulation such that features introduced by the manufacturing process may be identified. In some embodiments, the simulation data comprises the raw data from the simulation and must be further processed and/or manipulated to be meaningful.

Once simulation data has been generated, the impact of features may be quantified 104 as a function of how the features, at their given locations, impact the properties of the component. This may comprise assessing the effect of a given gap, overlap, angle deviation, and/or steering radius on at least one property of the composite component, such as strength, stability, and part quality. The process of quantifying the impact of the features may include 1) comparing the identification and characterization of the gaps, overlaps, angle deviations, and steering radius that are received from the simulation process to coupons or test plans in order to identify the correction factor; and 2) the correction factor is then applied to a location based safety margin (or design allowable) in order to quantify the impact of a given feature at a given location.

In some embodiments, the assessment of the effect of a feature on the properties of the component may have been previously done and resulting correction factors addressing the various impacts have already been provided and compiled into a design allowable database. Quantification may be done on a location-basis, to determine what the impact of a given feature is at a given location. Location-specific correction factors are assigned to the component, and the location-specific factors may then be correlated to a set of varying safety margins associated with location-specific areas of the composite component. Should the impact of all of the features be insignificant, the design is approved 108. If at least one feature has a significant impact, the design is rejected 106.

In some embodiments, the quantitative assessment may be used in a feedback loop to update the design parameters, thus causing the fiber laying trajectories to be modified, in order to generate revised simulation data for the component. Further analysis may be performed on the revised simulation data to determine if the changes have produced the desired outcome. The feedback loop provides the ability to direct the features away from zones with less margin and/or higher criticality and generate a set of optimized design parameters for a given composite component. This alternative embodiment is illustrated in FIG. 1b. Instead of simply being rejected, the design is modified 110 in a manner that may remove the feature and/or reduce its impact. Updated simulation data may then be generated 102 in order to reassess the modified design 104, until an acceptable design is reached and approved 108. Possible modifications to the design include, but are not limited to, adjustments made to angle tolerances at various locations, changes in ply boundaries and adjustments to part thicknesses, trajectories and gap overlap strategy.

Figure 2:
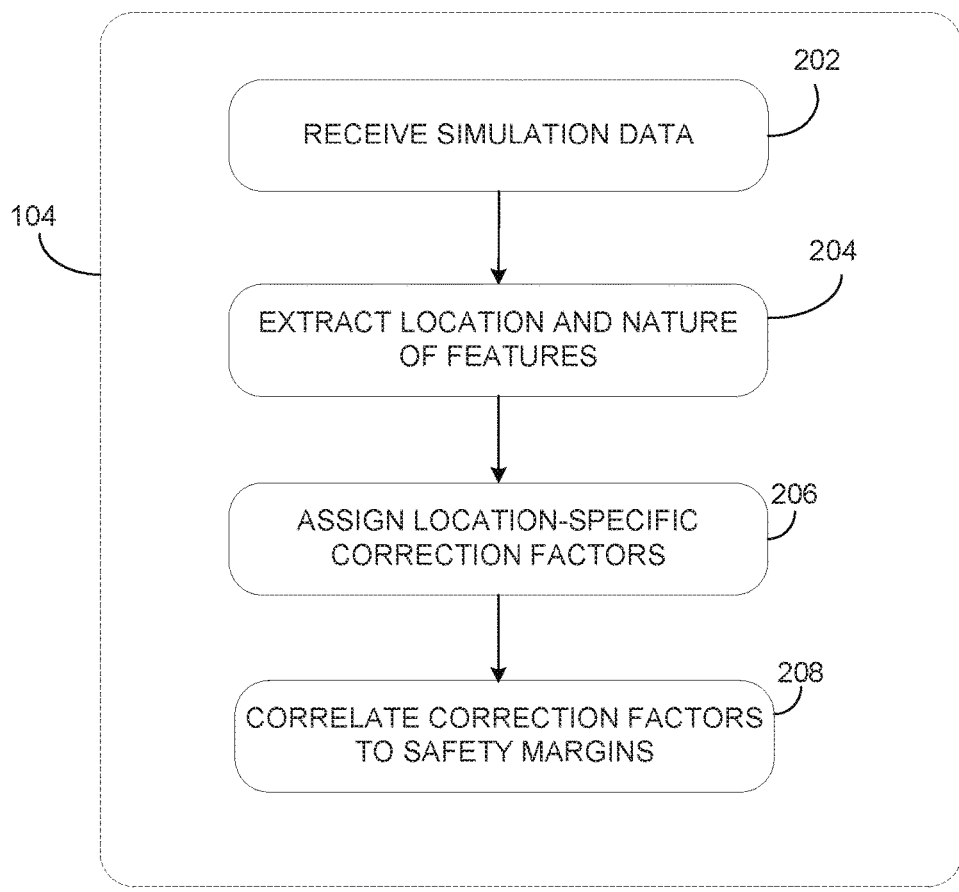
FIG. 2 is an exemplary flowchart of a method for quantifying an impact of features in accordance with one embodiment.

FIG. 2 is a flowchart of an exemplary embodiment for quantifying the impact of features 104. The simulation data is received 202 and the location and nature of features are extracted 204 from the simulation data. As indicated above, the nature of the feature may be any one of a gap, an overlap, a steering radius, an angle deviation, and any occurrence that affects the integrity of the component when manufactured. In some embodiments, the simulation data as received comprises a three-dimensional (3D) virtual representation of the composite component provided in a reference frame having three axes. Extracting the location of a feature may comprise assigning a position (x, y, z) to a given feature, thus providing its location in relation to the 3D reference frame. In some embodiments, the virtual representation may be provided as a series of successive two-dimensional (2D) views that together form the composite component. Extracting the location of a feature may comprise assigning a position (x, y) to a given feature on a given 2D view to provide its location.

In some embodiments, the simulation data as received may comprise a listing of positions (x, y, z) or (x, y) at which features are present and corresponding values for features. For example, an exemplary set of simulation data may correspond to the following:

(1,1,1); gap density=3.2; overlap=0; angle deviation=0; steering radius=1000
(1,3,9); gap density=0; overlap=2.0; angle deviation=0; steering radius=1000
(2,5,4); gap density=0; overlap=0; angle deviation=3°; steering radius=1000
(3,8,1); gap density=0; overlap=0; angle deviation=0; steering radius=8.5

In this example, only one of each type of feature is present in the composite component. A gap is present at position (1, 1, 1), an overlap is present at position (1, 3, 9), an angle deviation feature is present at position (2, 5, 4), and a steering radius feature is present at position (3, 8, 1). An absence of a feature at a given position may be assigned a value of zero or simply omitted from the simulation data. Note that more than one of each type of feature may be present, and a position may comprise more than one type of feature. The listing may also comprise all possible positions (x, y, z) or (x,y) and have values associated to each one of the potential features, a non-zero value indicating the presence of a feature. The features may thus be extracted by parsing the data and identifying the non-zero values and/or the values that exceed a predetermined threshold.

Figure 3A:
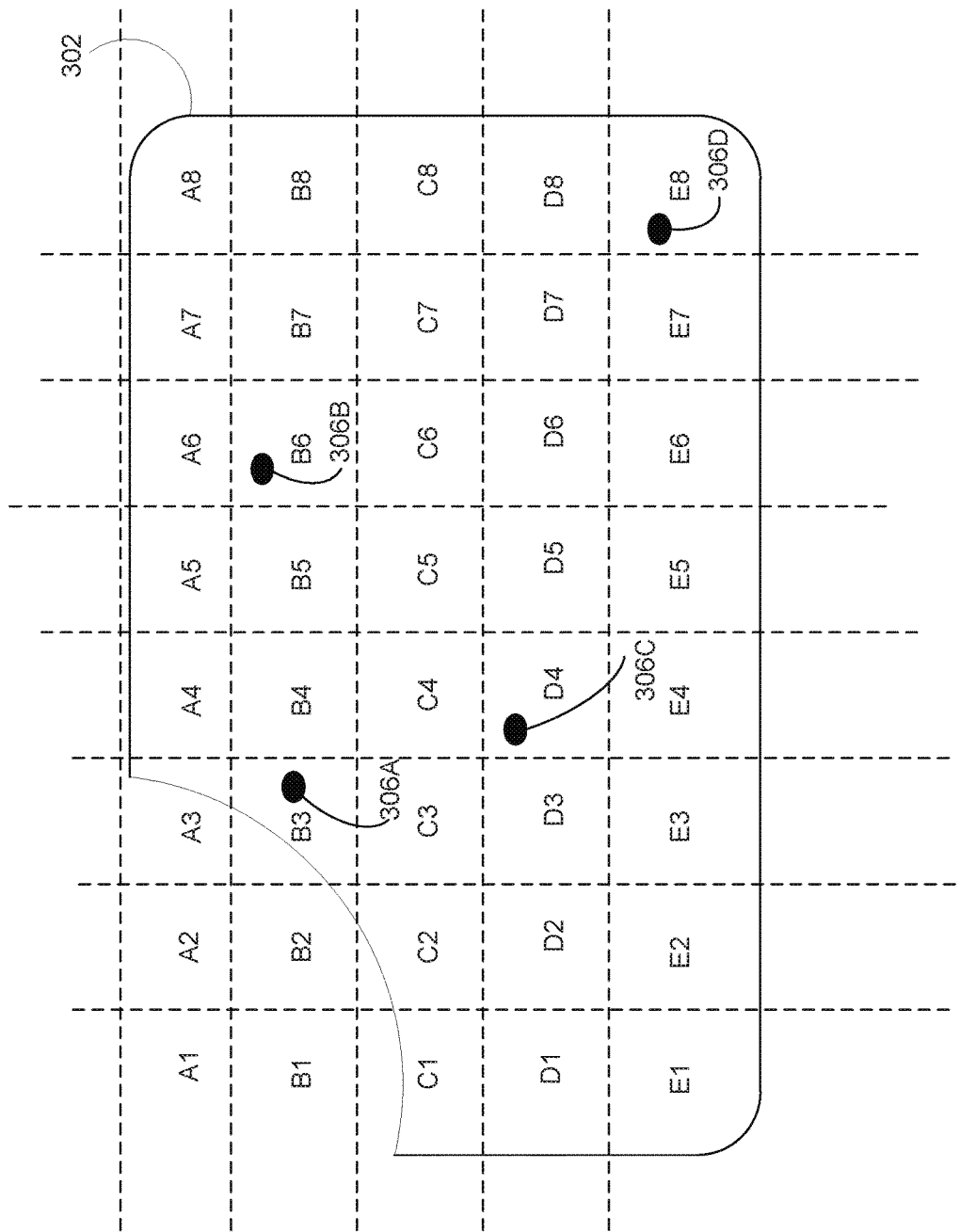
FIG. 3a is a schematic diagram illustrating an exemplary embodiment for determining a location of features on a composite component using a uniform grid pattern.

In another embodiment, the location of a feature may be determined using a grid-like pattern overlaid on the virtual representation of the composite component, either on a 2D or 3D view thereof. A position may be assigned to the feature as a function of a coordinate of the grid. FIG. 3a illustrates an embodiment for a 2D view of a virtual representation of a composite component 302. In this exemplary embodiment, an 8×5 grid covers the surface of the component 302 and each grid position is provided with an address. Features 306a, 306b, 306c, and 306d are found at grid positions B3, B6, D4 and E8 respectively. The grid positions may be increased in size, and thus more surface area is covered per grid position, by reducing the number of columns and/or rows of the grid. The grid positions may also be reduced in size by increasing the number of columns and/or rows. It may be desired to select the size of the grid to ensure that only one feature is present in any given grid position.

Figure 3B:
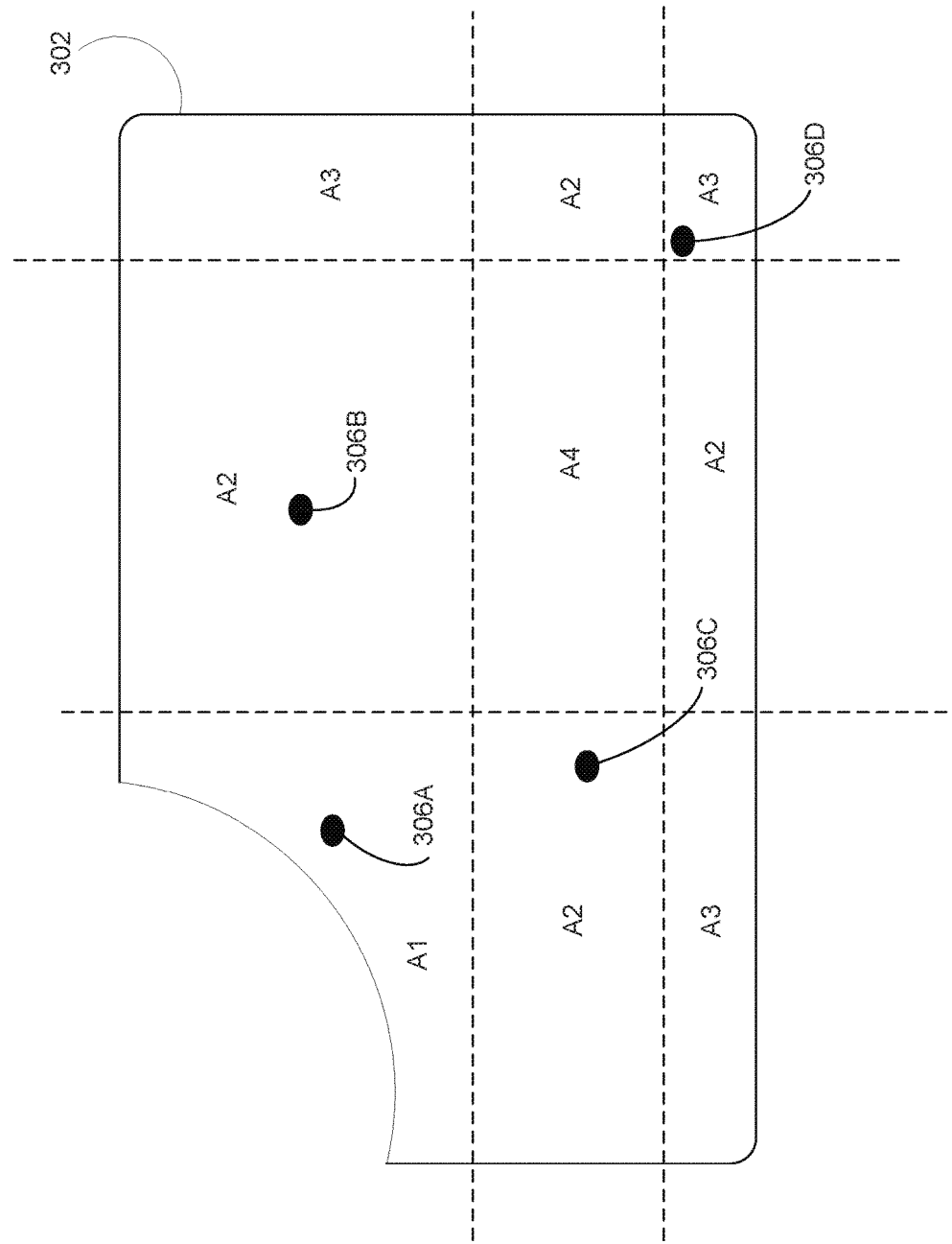
FIG. 3b is a schematic diagram illustrating an exemplary embodiment for determining a location of features on a composite component using a non-uniform grid pattern.

Alternatively, the grid pattern may be selected as a function of a particular characteristic of the composite component, or using one or more considerations, such as the proximity to an edge, the type of edge, etc. FIG. 3b illustrates such an embodiment; whereby grid position A1 includes a curved edge and a corner, grid position A2 includes a straight edge, grid position A3 includes a curved edge, and grid position A4 includes no edges. In this embodiment; feature 306a is located in grid position A1 features 306b and 306c are located in grid position A2 and feature 306d is located in grid position A3. Thus when extracting the location of the features, more than one feature may be found to have a same location. Note that the pattern used to circumscribe the grid positions may be symmetrical, nonsymmetrical, uniform, non-uniform, and the grid positions themselves may be of varying shapes and/or sizes.

Referring back to FIG. 2, once location and nature of the features has been extracted 204, location-specific correction factors are assigned to the composite component 206. The correction factors are said to be "location-specific" in that more than one correction factor may be assigned to a given part 302, as a function of the location of a feature on the part. The correction factor thus applies only to the location to which it has been applied, not to the entire part. In some embodiments, a lookup table comprising correction factors for corresponding feature values may be used. These correction factors may have been validated or be representative of test results. For example, a gap density of value x may be associated with a correction factor of 10%, a gap density of value y may be associated with a correction factor of 15%, etc. Similarly, an angle deviation of value z may be associated with a correction factor of 30%, an overlap of value q may be associated with a correction factor of 25%, etc. Correction factors may be associated with single values, ranges of values, combinations of features (i.e. a gap and an angle deviation in a same region), etc. Correction factors may depend on the location of the feature, the nature of the feature, the component property, the materials used in the component, and other elements that may have an impact on the effect of the feature on the component property.

Figure 4:
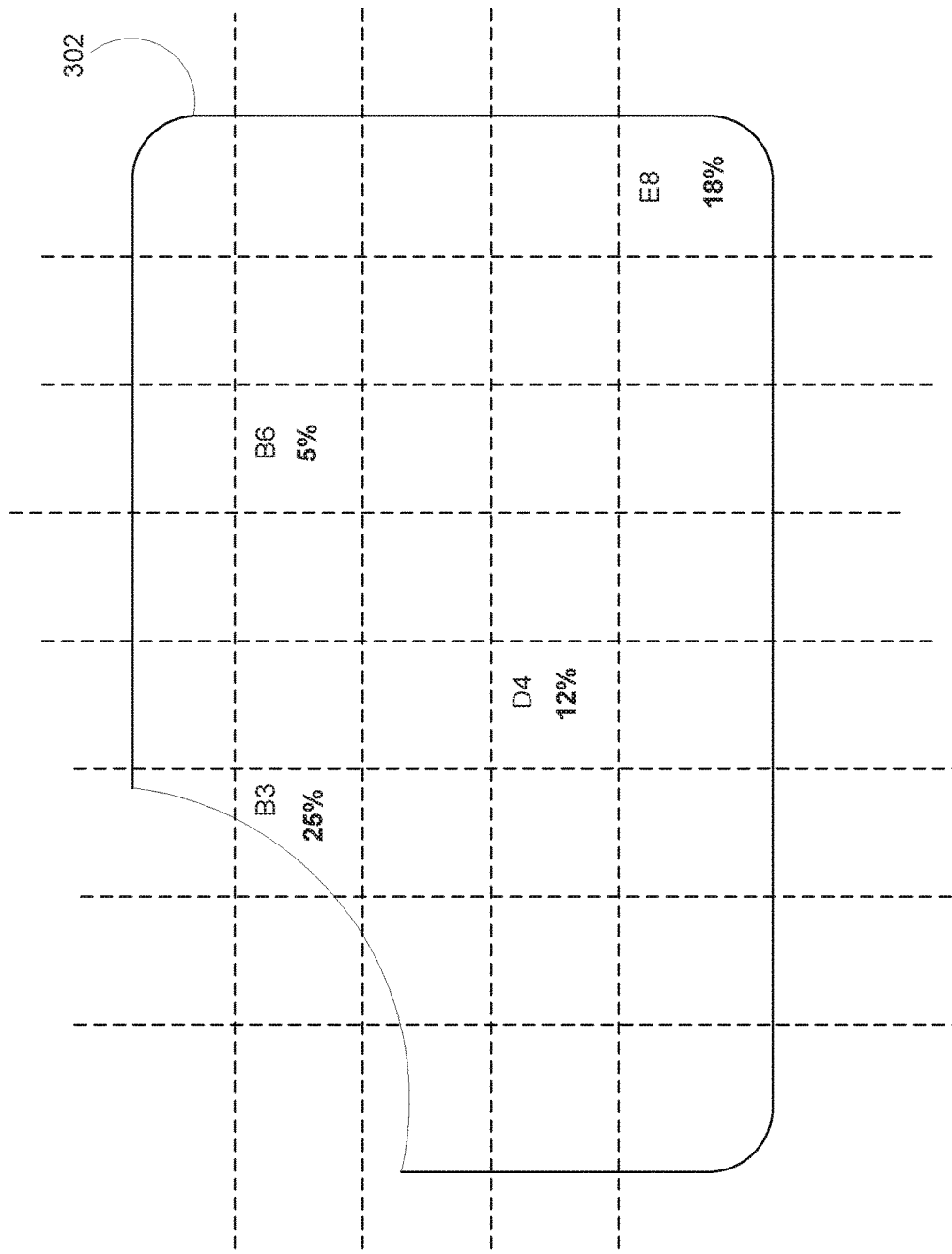
FIG. 4 is a schematic diagram illustrating an exemplary embodiment for assigning location-specific correction factors.

FIG. 4 illustrates an exemplary embodiment of assigning location-specific correction factors, using the grid pattern illustrated in FIG. 3a. Grid positions B3, B6, D4, and E8 are assigned correction factors of 25%, 5%, 12%, and 18%, respectively. These correction factors are determined as a result of the presence of features 306a, 306b, 306c, and 306d found in grid positions B3, B6, D4, and E8. The location-specific correction factors may then be correlated to the safety margins of the composite component 208, at each specific location. Correlating refers to establishing the relationship or connection between the location-specific correction factors and the safety margins.

Figure 5:
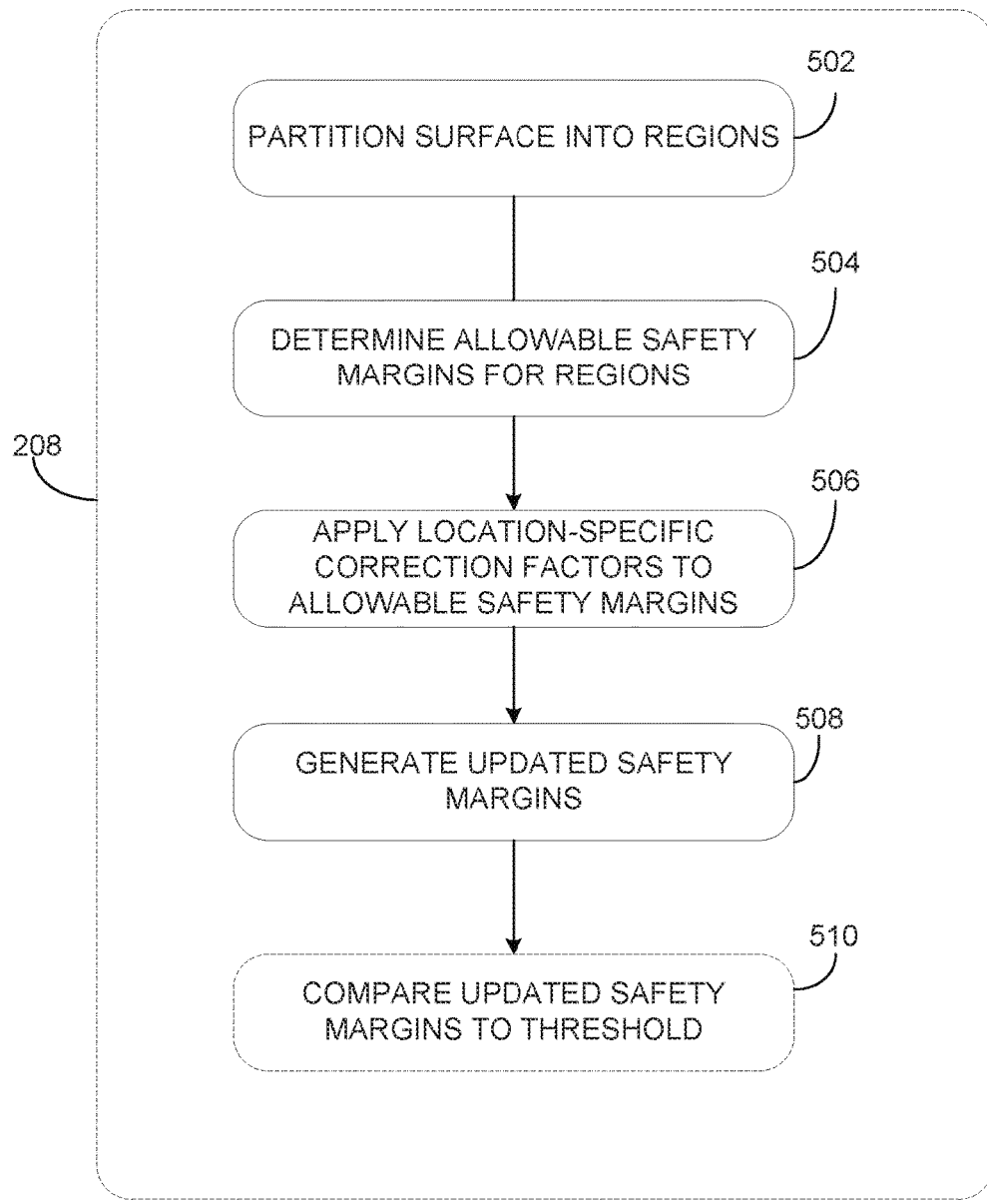
FIG. 5 is an exemplary flowchart of a method for correlating correction factors to safety margins in accordance with one embodiment.
Figure 6:
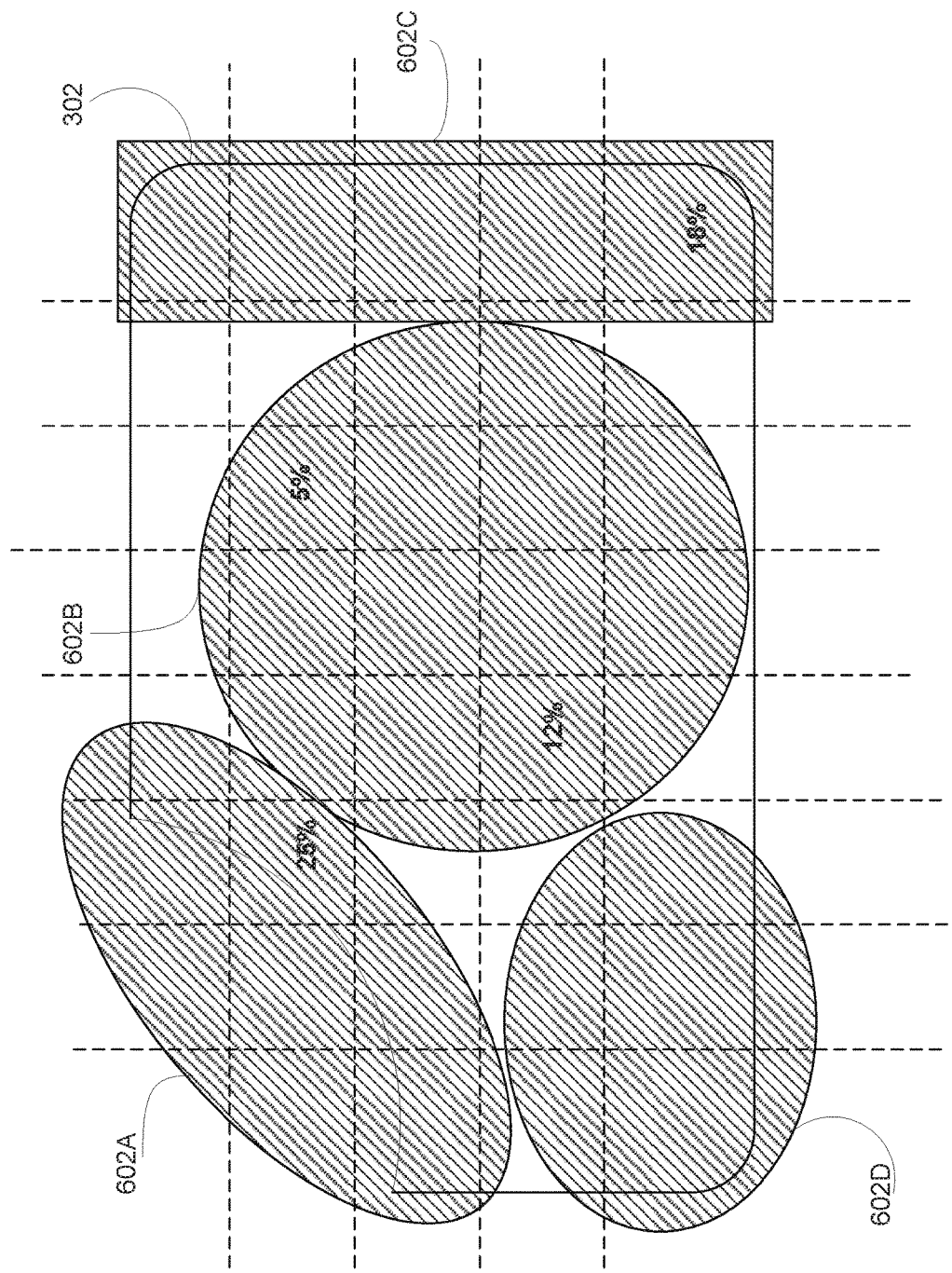
FIG. 6 is a schematic diagram illustrating an exemplary embodiment for partitioning a surface into a plurality of regions having varying safety margins.

FIG. 5 is an exemplary flowchart illustrating an embodiment for correlating the location-specific correction factors to the safety margins 208. The surface of the composite component may be partitioned into regions 502, as illustrated in FIG. 6. In this example, four regions 602a, 602b, 602c, and 602d are provided on the surface of the composite component 302, each region characterized by a safety margin 504. The location-specific correction factors may be applied to the safety margins 506, as per the example above, by using the true allowables instead of the design allowables. Updated safety margins are generated 508 to represent an "as manufactured" design. In some embodiments, the updated safety margins may be compared to predetermined thresholds 510, such as those set by law or industry standards, or those set by the composite component manufacturer, to determine if the design is acceptable. Should the thresholds be exceeded, the design may be rejected and optionally the design parameters may be modified.

In some embodiments, modifying the design parameters comprises directing the features away from regions of lower safety margins to regions of higher safety margins. This may be done by changing angle tolerances, changing part thicknesses, and/or redefining ply boundaries so that the gaps, overlaps, steering radius, and/or angle deviations occur at a different location on the composite component. In some embodiments, the design parameters are modified to redistribute the features more uniformly throughout the composite component. Some of the robot parameters that may modified to effect these changes are AFP simulation trajectory (a single rosette/coordinate system or a collection of rosettes/coordinate systems by zone or an interpolation between them), ply staggering profile and distances by common orientation, minimum cut length of a tow, and machine layup speed and temperature.

Figure 7:
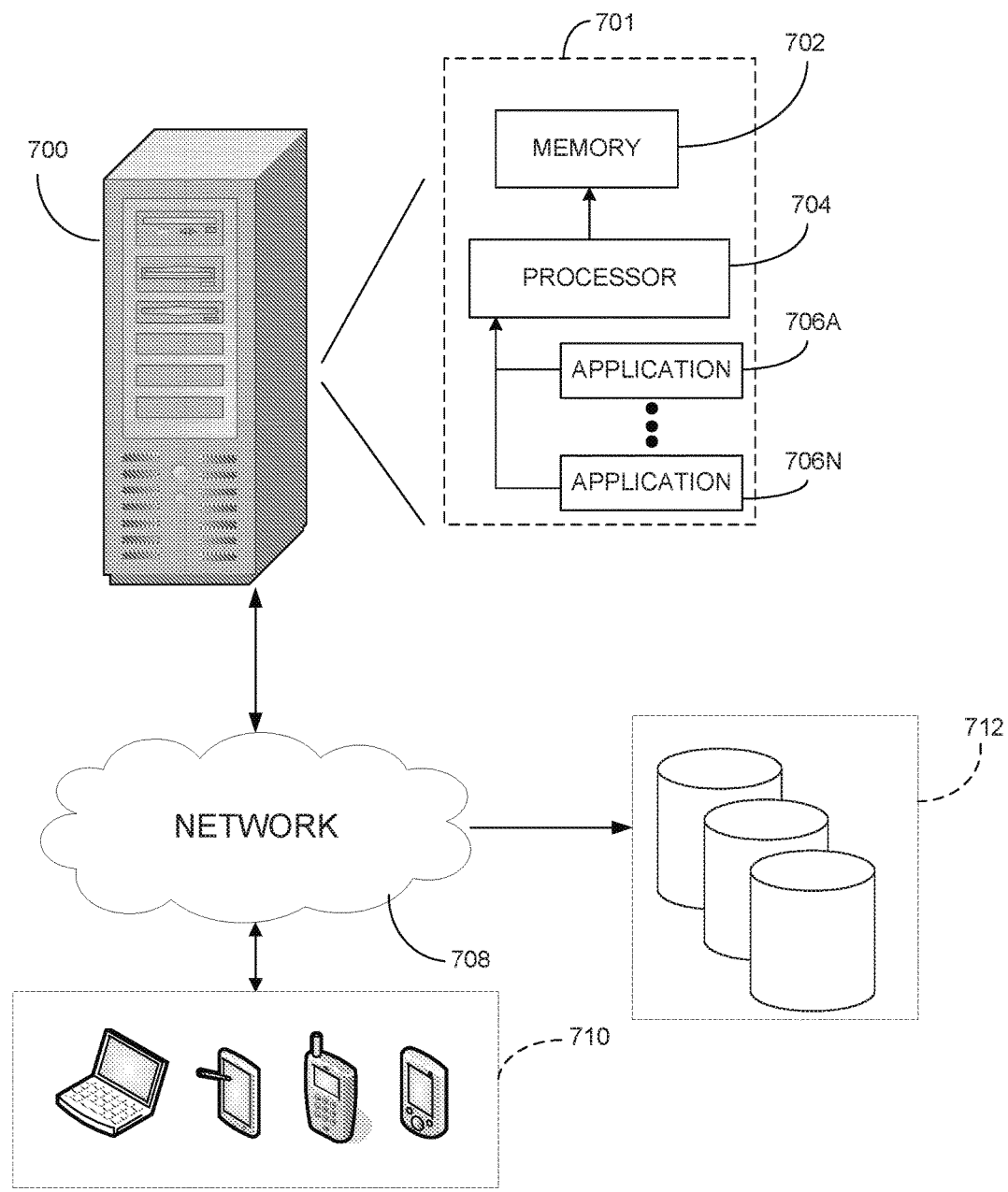
FIG. 7 is an exemplary block diagram of a system for quantifying an impact of a feature on a composite component in accordance with one embodiment.

FIG. 7 illustrates an exemplary system 701 for quantifying an impact of features on a composite component to be manufactured using an automated fiber placement (AFP) manufacturing process. In the embodiment illustrated, the system 701 is adapted to be accessed by a plurality of devices 710 via a wireless network 708, such as the Internet, a cellular network, Wi-Fi, or others known to those skilled in the art. The devices 710 may comprise any device, such as a laptop computer, a personal digital assistant (PDA), a smartphone, or the like, adapted to communicate over the wireless network 708. Alternatively, the system 701 may be provided in part or in its entirety directly on devices 710, as a native application or a web application. It should be understood that cloud computing may also be used such that the system 701 is provided partially or entirely in the cloud. In some embodiments, the application 706a may be downloaded directly onto devices 710 and application 706n communicates with application 706a via the network 708.

The system 701 may reside on one or more server(s) 700. For example, a series of servers corresponding to a web server, an application server, and a database server may be used. These servers are all represented by server 700 in FIG. 7. The system 701 may comprise, amongst other things, a processor 704 in data communication with a memory 702 and having a plurality of applications 706a, . . . , 706n running thereon. The processor 704 may access the memory 702 to retrieve data. The processor 704 may be any device that can perform operations on data. Examples are a central processing unit (CPU), a microprocessor, and a front-end processor. The applications 706a, . . . , 706n are coupled to the processor 704 and configured to perform various tasks as explained below in more detail. It should be understood that while the applications 706a, . . . , 706n presented herein are illustrated and described as separate entities, they may be combined or separated in a variety of ways. It should be understood that an operating system (not shown) may be used as an intermediary between the processor 704 and the applications 706a, . . . , 706n.

The memory 702 accessible by the processor 704 may receive and store data, such as correction factors, safety margins, location of features, nature of features, etc. The memory 702 may be a main memory, such as a high speed Random Access Memory (RAM), or an auxiliary storage unit, such as a hard disk or flash memory. The memory 702 may be any other type of memory, such as a Read-Only Memory (ROM), Erasable Programmable Read-Only Memory (EPROM), or optical storage media such as a videodisc and a compact disc.

One or more databases 712 may be integrated directly into the memory 702 or may be provided separately therefrom and remotely from the server 700 (as illustrated). In the case of a remote access to the databases 712, access may occur via any type of network 708, as indicated above. The databases 712 may also be accessed through an alternative wireless network or through a wired connection. The databases 712 described herein may be provided as collections of data or information organized for rapid search and retrieval by a computer. The databases 712 may be structured to facilitate storage, retrieval, modification, and deletion of data in conjunction with various data-processing operations. The databases 712 may consist of a file or sets of files that can be broken down into records, each of which consists of one or more fields. Database information may be retrieved through queries using keywords and sorting commands, in order to rapidly search, rearrange, group, and select the field. The databases 712 may be any organization of data on a data storage medium, such as one or more servers.

In one embodiment, the databases 712 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

Figure 8:
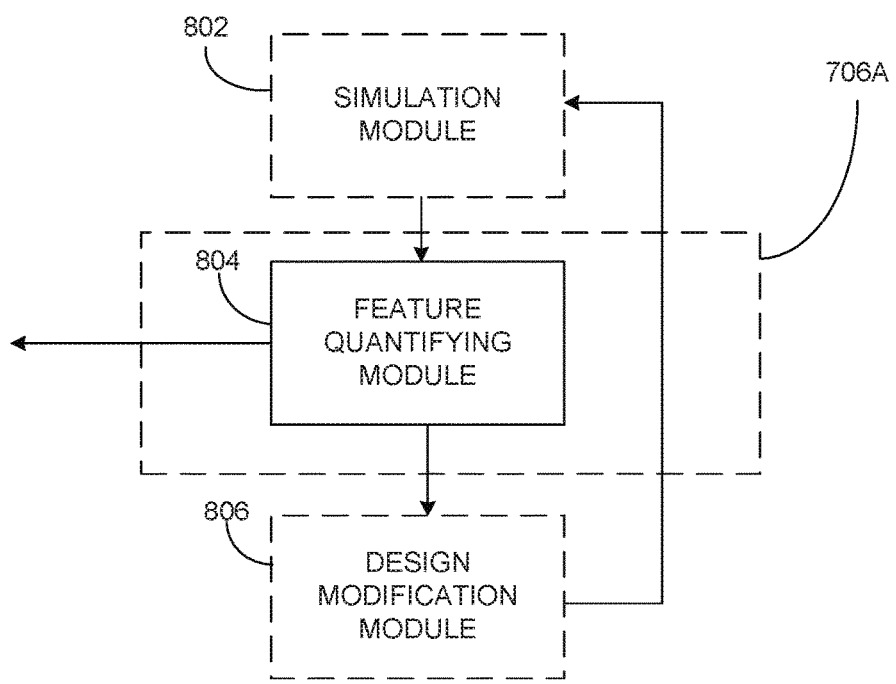
FIG. 8 is an exemplary block diagram of an application from the system of FIG. 7.

Referring now to FIG. 8, there is illustrated an exemplary block diagram of application 706a, for quantifying an impact of features on a composite component. A feature quantifying module 804 receives simulation data from a simulation module 802, which may form part of the system 701 but be separate from application 706a, as illustrated. Alternatively, the simulation module 802 may form part of application 706a. Also alternatively, the simulation module 802 may be remote from system 701, and simulation data may be received via network 708. Similarly, a design modification module 806 is operatively connected to the feature quantifying module 804 and may be separate from the application 706a while forming a part of the system 701, integrated into application 706a, or remote from system 701 and accessible via network 708. The design modification module 806 may be configured to modify design parameters when a design is rejected or identified as requiring modification.

Figure 9:
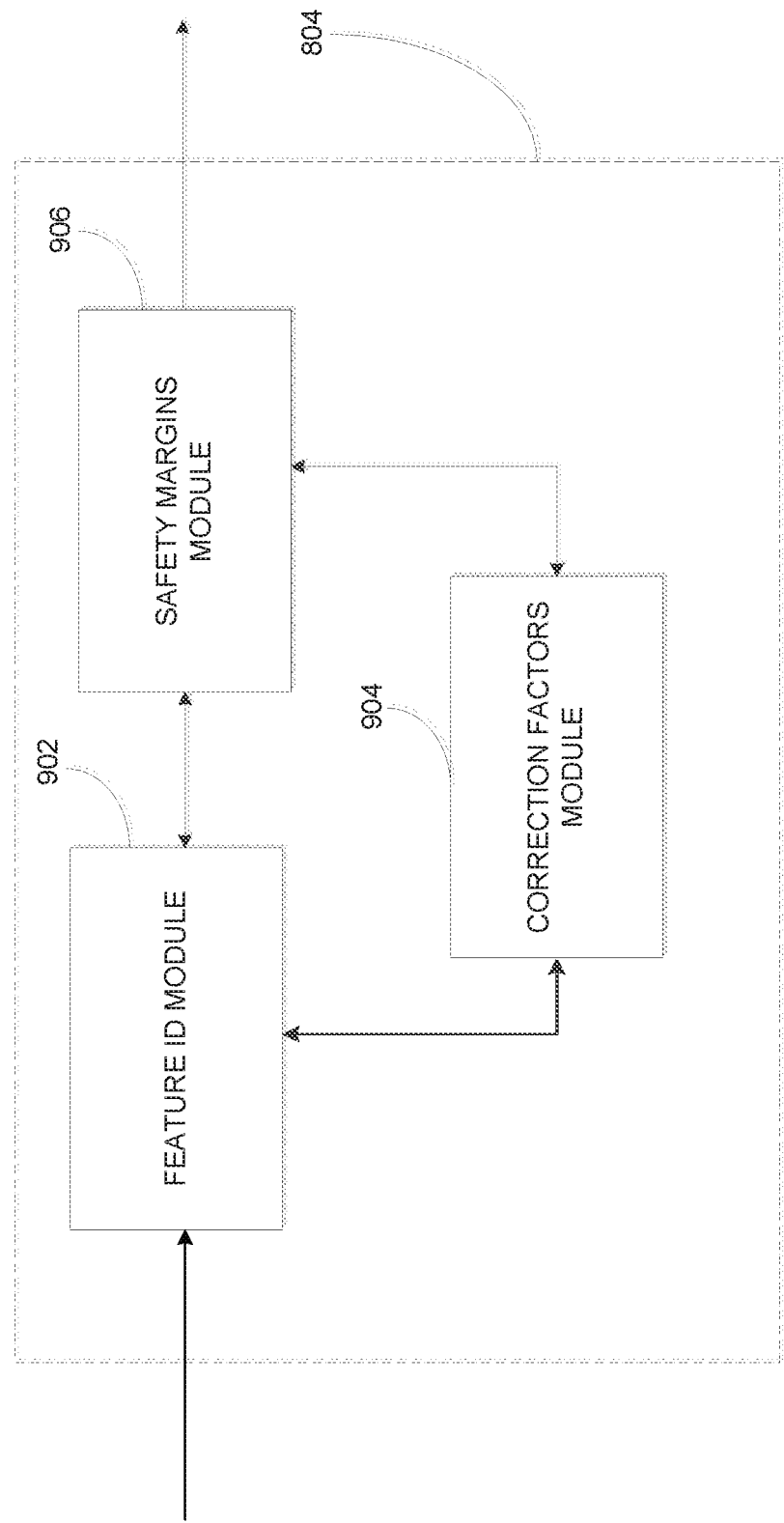
FIG. 9 is an exemplary block diagram of a feature quantifying module.

FIG. 9 illustrates an exemplary embodiment of the feature quantifying module 804. A feature ID module 902 is configured to receive a set of simulation data related to the virtual simulation of the AFP manufacturing process for the composite component using a set of fiber laying trajectories, and extract the location and nature of the features. As described above, extraction of the location and nature of the features may be done using various techniques, such as based on 2D and 3D images of a manufactured component. In some embodiments, the actual location and nature of the features is determined by the simulation module 802 and the feature ID module 902 will receive a data stream and extract the location and nature of the features from the data stream. A correction factors module 904 is configured to assign location-specific correction factors to the composite component as a function of the impact of the features at the corresponding locations. A safety margins module 906 is configured to correlate the location specific factors to allowable safety margins at each one of the corresponding locations.

In some embodiments, the safety margins module 906 may be configured to partition a surface of the composite component into a plurality of regions and determine the allowable safety margins for the plurality of regions. Alternatively, such partitioning may be performed outside of the feature quantifying module 804 and fed to the safety margins module 906. The correction factors module 904 may be configured to apply the location-specific correction factors to the allowable safety margins for regions having features located therein, and the safety margins module 906 may generate updated safety margins per region. In some embodiments, the safety margins module 906 may be configured to reject the design when at least one of the updated safety margins falls below a predetermined threshold. The safety margins module 906 may also be configured to communicate with the design modification module 806 to request changes to the design.

The design modification module 806 may be configured to receive a data signal from the feature quantifying module 804. The data signal may be a rejection signal when a set of design parameters have been rejected for failure to meet a criteria, such as a threshold for safety margins of the component once correction factors have been applied. The rejection signal may be used by the design modification module 806 to trigger modifications to the design parameters, such as changes to angle tolerances at various locations, changes in ply boundaries and adjustments to part thicknesses, trajectories and gap overlap strategy. The design modification module 806 may be configured to suggest certain modifications as a function of the type of feature and the location of the feature. The level of impact a feature has on the design may also be a factor in determining how the design parameters are changed. For example, if an updated safety margin is slightly below a predetermined threshold, the design modification module 806 may modify a fiber laying trajectory to displace the feature to a zone of lower criticality. If the updated safety margin is significantly below a predetermined threshold, the design modification module may increase ply thickness to remedy the situation. The design modification module 806 may make changes directly to the design parameters, or may provide recommendations to be applied to the design parameters.

In some embodiments, the data signal received by the design modification module 806 is a verification request and the design modification module 806 compares updated safety margins to predetermined thresholds. The determination as to whether the design parameters are acceptable or not may then be performed by the design modification module 806. The design modification module 806 may communicate with the simulation module 802 to perform a new simulation using updated design parameters.

The feature quantifying module 804 may be configured to output a signal (i.e. approved/rejected), display a message on a display device (i.e. approved/rejected or details regarding rejection), or provide graphical information on a display device. For example, the component as illustrated in FIG. 6 with the safety margin zones may be displayed, and the zones may be color coded to indicate which ones are acceptable and which ones are rejected. A color code such as red for rejected, green for accepted, and yellow for borderline may be used. Other color codes may also be used, as well as other types of visual indicators. The different features may themselves be color-coded for visual display, and different levels of impact may be displayed visually using various techniques.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, or can be provided on a computer readable medium having stored thereon program code executable by a processor. The embodiments of the invention described above are intended to be exemplary only. The scope of the invention is therefore intended to be limited solely by the scope of the appended claims.

The invention claimed is:

1. A computer-implemented method for quantifying an impact of features on a composite component to be manufactured using an automated manufacturing process, the features resulting from the manufacturing process, the method comprising:
   simulating an automated fiber placement manufacturing process to obtain a set of simulation data;
   receiving the set of simulation data related to a virtual simulation of the manufacturing process for the composite component using a set of design parameters;
   extracting a location and nature of the features from the set of simulation data;
   assigning location-specific correction factors to the composite component as a function of an impact of the features at corresponding locations, wherein assigning location-specific correction factors comprises retrieving the location-specific correction factors from a lookup table comprising predetermined correction factors for corresponding feature values, the predetermined correction factors having been validated or being representative of test results; and
   correlating the location-specific correction factors to allowable safety margins at each one of the corresponding locations.

2. The method of claim 1, wherein correlating the location-specific correction factors to allowable safety margins comprises:
   partitioning a surface of the composite component into a plurality of regions;
   determining the allowable safety margins for the plurality of regions;
   applying the location-specific correction factors to the allowable safety margins for regions having features located therein; and
   generating updated safety margins per region.

3. The method of claim 2, further comprising rejecting the design parameters when at least one of the updated safety margins falls below a predetermined threshold.

4. The method of claim 2, further comprising modifying the design parameters when at least one of the updated safety margins falls below a predetermined threshold.

5. The method of claim 4, wherein modifying the design parameters comprises modifying angle tolerances.

6. The method of claim 4, wherein modifying the design parameters comprises directing at least one feature from a region of lower safety margin to a region of higher safety margin.

7. The method of claim 2, further comprising modifying the design parameters to redistribute the features throughout the composite component.

8. The method of claim 7, further comprising repeating steps of receiving a set of simulation data, extracting a location and nature of the features, assigning location-specific correction factors, and correlating the location-specific correction factors, with the design parameters as modified.

9. The method of claim 8, wherein repeating comprises further modifying the design parameters and continuing the repeating until acceptable design parameters are obtained.

10. The method of claim 1, wherein the automated manufacturing process is an automated fiber placement process.

11. A system for quantifying an impact of features on a composite component to be manufactured using an automated manufacturing process, the features resulting from the manufacturing process, the system comprising:
- a memory;
- a processor; and
- at least one application stored in the memory and executable by the processor for to perform the steps of:
- simulating an automated fiber placement manufacturing process to obtain a set of simulation data;
- receiving the set of simulation data related to a virtual simulation of the manufacturing process for the composite component using a set of design parameters;
- extracting a location and nature of the features from the set of simulation data;
- assigning location-specific correction factors to the composite component as a function of an impact of the features at corresponding locations, wherein assigning location-specific correction factors comprises retrieving the location-specific correction factors from a lookup table comprising predetermined correction factors for corresponding feature values, the predetermined correction factors having been validated or being representative of test results; and
- correlating the location-specific correction factors to allowable safety margins at each one of the corresponding locations.

12. The system of claim 11, wherein correlating the location-specific correction factors to allowable safety margins comprises:
- partitioning a surface of the composite component into a plurality of regions;
- determining the allowable safety margins for the plurality of regions;
- applying the location-specific correction factors to the allowable safety margins for regions having features located therein; and
- generating updated safety margins per region.

13. The system of claim 12, wherein the at least one application is further configured for rejecting the design parameters when at least one of the updated safety margins falls below a predetermined threshold.

14. The system of claim 12, wherein the at least one application is further configured for modifying the design parameters when at least one of the updated safety margins falls below a predetermined threshold.

15. The system of claim 14, wherein modifying the design parameters comprises modifying angle tolerances.

16. The system of claim 14, wherein modifying the design parameters comprises directing at least one of the features from a region of lower safety margin to a region of higher safety margin.

17. The system of claim 12, wherein the at least one application is further configured for modifying the design parameters to redistribute the features throughout the composite component.

18. The system of claim 17, wherein the at least one application is further configured for repeating steps of receiving a set of simulation data, extracting a location and nature of features, assigning location-specific correction factors, and correlating the location-specific correction factors, with the design parameters as modified.

19. The system of claim 18, wherein repeating comprises further modifying the design parameters and continuing the repeating until an acceptable design is obtained.

20. The system of claim 11, wherein the automated manufacturing process is an automated fiber placement process.

21. A non-transitory computer readable medium having stored thereon program code executable by a processor for quantifying an impact of features on a composite component to be manufactured using an automated manufacturing process, the features resulting from the manufacturing process, the program code executable for to perform a method comprising:
- simulating an automated fiber placement manufacturing process to obtain a set of simulation data;
- receiving the set of simulation data related to a virtual simulation of the manufacturing process for the composite component using a set of design parameters;
- extracting a location and nature of the features from the set of simulation data;
- assigning location-specific correction factors to the composite component as a function of an impact of the features at corresponding locations, wherein assigning location-specific correction factors comprises retrieving the location-specific correction factors from a lookup table comprising predetermined correction factors for corresponding feature values, the predetermined correction factors having been validated or being representative of test results; and
- correlating the location-specific correction factors to allowable safety margins at each one of the corresponding locations.

* * * * *